United States Patent [19]
Sommer

[11] Patent Number: 6,003,314
[45] Date of Patent: *Dec. 21, 1999

[54] HYDROSTATIC DRIVE WITH SYNCHRONIZED DIRECT THROUGH-DRIVE

[75] Inventor: Josef Sommer, Oberdischingen, Germany

[73] Assignee: Brueninghaus Hydromatik GmbH, Elchingen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/894,345
[22] PCT Filed: Jun. 14, 1996
[86] PCT No.: PCT/EP96/02565
   § 371 Date: Aug. 16, 1997
   § 102(e) Date: Aug. 16, 1997
[87] PCT Pub. No.: WO97/02444
   PCT Pub. Date: Jan. 23, 1997

[30] Foreign Application Priority Data

Jul. 3, 1995 [DE] Germany ............ 195 24 188

[51] Int. Cl.[6] .................... F16D 31/02; F16D 39/00
[52] U.S. Cl. ............................................. 60/438
[58] Field of Search ................................. 60/438

[56] References Cited

U.S. PATENT DOCUMENTS

| | | | |
|---|---|---|---|
| 2,397,343 | 3/1946 | Ferris | 60/438 |
| 2,666,293 | 1/1954 | Vigneau | 60/438 |

FOREIGN PATENT DOCUMENTS

| | | |
|---|---|---|
| 417283 | 12/1989 | European Pat. Off. . |
| 3540218 | 5/1986 | Germany . |

*Primary Examiner*—F. Daniel Lopez
*Attorney, Agent, or Firm*—Scully, Scott, Murphy & Presser

[57] ABSTRACT

Hydrostatic drive having synchronized direct through-drive. The invention relates to a hydrostatic drive, in particular a vehicle drive. The hydrostatic drive includes a drive motor (1), a hydrostatic transmission (2), having a hydraulic pump (3) coupled to the drive motor (1) and a hydraulic motor (4) coupled to an output drive shaft (11). For the direct drive of the output drive shaft (11) there is provided a direct through-drive shaft (16), which can be coupled, releasably, to the drive shaft (11) via a separating clutch (17). For the synchronization of the drive motor side speed of rotation ($n_1$) to the drive shaft side speed of rotation ($n_2$) at the separating clutch (17) there are provided two speed-of-rotation sensors (18, 19). The synchronization is effected by means of purposive loading or de-loading of the drive motor (11) by means of the hydrostatic transmission (2).

9 Claims, 1 Drawing Sheet

HYDROSTATIC DRIVE WITH SYNCHRONIZED DIRECT THROUGH-DRIVE

BACKGROUND OF THE INVENTION

1. Field of the Invention

The invention relates to a hydrostatic drive, in particular for vehicles.

2. Discussion of the Prior Art

A hydrostatic drive with direct through-drive is known from DE-35 40 218 A1. The known drive includes a drive motor, a hydrostatic transmission with a hydraulic pump arranged in a hydraulic circuit, which pump is coupled to the drive motor, and a hydraulic motor which is coupled with an output drive shaft. Further, a direct through-drive shaft is present which directly couples the drive motor with the output is drive shaft, releasably via a separating clutch. The separating clutch is closed at a predetermined speed of rotation of the drive motor, in order to connect the drive motor directly with the output drive shaft, by-passing the hydrostatic transmission. Upon switching from drive via the drive hydrostatic transmission to a drive by means of the direct through-drive shaft there can, however, occur a change-over jerk.

In DE-40 26 659 A1, for the coupling of a mechanical countershaft transmission to a drive machine via a release clutch, it is proposed to so control the drive machine upon each release procedure that the speed of rotation of the drive machine is greater than the speed of rotation of the input shaft of the countershaft transmission. By these means it is ensured that the clutch is loaded in traction in every switching procedure.

Starting from DE 35 40 218 A1, the object of the present invention is to so further develop a hydrostatic drive with direct through-drive shaft that the change-over from a drive via the hydrostatic transmission to a drive by means of a direct through-drive shaft takes place substantially without jerking, and to indicate a method for the operation of such a hydrostatic drive.

With regard to the hydrostatic drive, the invention is solved by the features of claim 1.

SUMMARY OF THE INVENTION

The invention is based on the insight that a synchronization of the speed of rotation at the separating clutch on the drive motor side to the speed of rotation at the separating clutch on the drive shaft side can be effected in an efficient manner via the hydrostatic transmission connected with the drive motor. Thereby, by means of purposive action on the hydrostatic transmission, the drive motor is either loaded or de-loaded in order to attain the synchronizing increase or decrease of the speed of rotation on the drive motor side. This procedure is particularly advantageous since, apart from the necessary speed-of-rotation sensors, it requires no further constructional measures.

If the hydraulic motor of the hydrostatic transmission is adjustable, the synchronization can be effected in the manner that the hydraulic motor is swung out to a larger displacement volume if, at the beginning of the synchronization, the speed of rotation on the drive motor side at the separating clutch is smaller than the speed of rotation at the drive shaft side. On the other hand, the hydraulic motor is swung back to smaller displacement volumes if, at the beginning of the synchronization, the speed of rotation at the drive motor side is larger than the speed of rotation at the drive shaft side at the separating clutch.

If the hydraulic pump of the hydrostatic transmission is adjustable, then, in accordance with claim 3 one proceeds in an opposite manner. If, at the beginning of the synchronization, the drive motor side speed of rotation is greater than the drive shaft speed of rotation at the separating clutch, the hydraulic pump is swung out to a larger displacement volume, whilst the hydraulic pump is swung back to a smaller displacement volume if, at the beginning of the synchronization, the drive motor side speed of rotation is smaller than the drive shaft side speed of rotation at the separating clutch.

As sensor for the speed of rotation of the drive motor, there may be employed the generator coupled to the drive motor, whereby the frequency of the output voltage of the generator—which is proportional to the speed of rotation of the drive motor—is available as a signal for evaluation.

The change-over between a drive via the hydrostatic transmission to a drive by means of the direct through-drive shaft can be effected automatically. Thereby, change-over to the direct through-drive shaft takes place when the speed of rotation of the drive motor exceeds a predetermined speed of rotation. Oppositely, the separating clutch is opened again if the speed of rotation of the drive motor falls below a predetermined speed of rotation.

BRIEF DESCRIPTION OF THE DRAWING

Below, the invention will be described in more detail with reference to a preferred exemplary embodiment and with reference to the drawing, the single Figure of which shows.

DETAILED DESCRIPTION OF A PREFERRED EMBODIMENT

Figure 1:
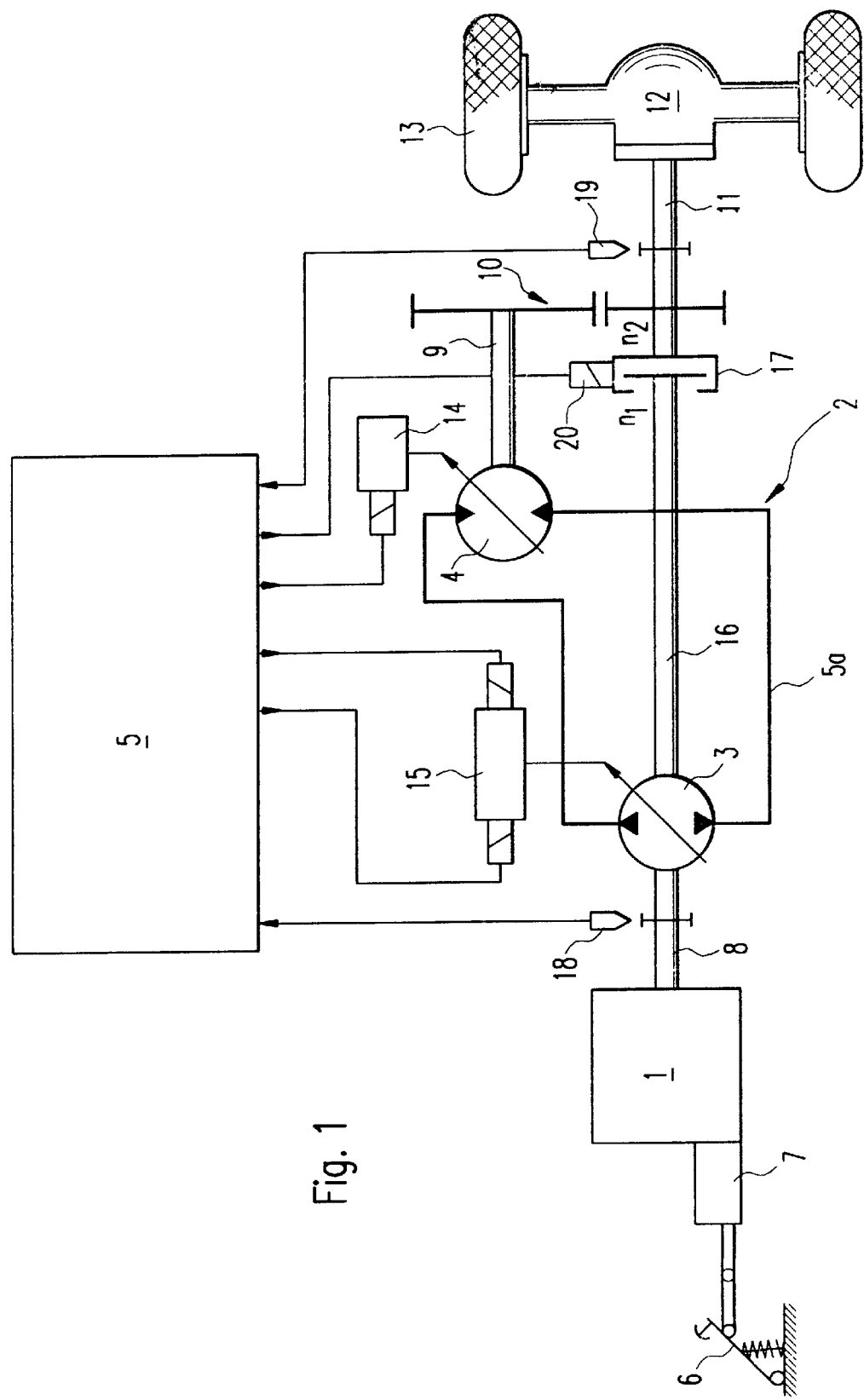
FIG. 1 a circuit diagram of a hydrostatic transmission in accordance with an exemplary embodiment of the invention.

The hydrostatic drive according to the exemplary embodiment illustrated in FIG. 1 is provided as a travel drive for vehicles and includes inter alia a drive motor 1, a hydrostatic transmission, generally designated with the reference sign 2, which transmission includes a hydraulic pump 3 and a hydraulic motor 4 which are arranged in a hydraulic circuit 5. The power of the drive motor 1 is controllable via a gas pedal 6 which acts upon an injection pump 7 or a throttle valve.

The hydraulic pump 3 of the hydrostatic transmission 2 is coupled with the drive motor 1 via a shaft 8, whilst the hydraulic motor 4 is coupled with the output drive shaft 11 via a hydraulic motor shaft 9 and a transmission 10. The drive shaft 11 drives the vehicle wheels 13 via a differential 12.

The displacement volume of the hydraulic motor is settable via a first setting member 14 of an adjustment device 14, 15, whilst the displacement volume of the hydraulic pump 3 is variable via a second setting member 15 of the setting device 14, 15. The setting members 14 and 15 of the adjustment device 14, 15 are controlled by an electronic control unit 5 and may, in known manner, have electromagnets, and adjust the inclination of a swash plate or wobble plate of the hydraulic motor 4 or of the hydraulic pump 3. For the present invention it is, however, sufficient when either only the hydraulic motor 4 or only the hydraulic pump 3 is adjustable.

The shaft 8 of the drive motor 1 is extended as direct through-drive shaft 16 and can be releasably coupled with the drive shaft 11 via a separating clutch 17. The opening and closing of the separating clutch 17 is effected by means of an actuating device 20 which is controllable by the electronic control unit 5.

The direct through-drive shaft 16 serves, in known manner, for the by-passing of the hydrostatic transmission 2 in rapid travel operation above a predetermined speed of rotation of the drive motor 1, in order to increase the efficiency of the overall drive in this rapid travel operation.

In accordance with the invention there are further provided two sensors 18 and 19, in order to detect the drive motor side speed of rotation $n_1$ and the drive shaft side speed of rotation $n_2$ at the separating clutch 17. The sensor 18 may be arranged at the shaft 8 of the drive motor 1 coupled with the through-drive shaft 16—as shown in FIG. 1. The sensor 19 may be arranged, as in the exemplary embodiment illustrated in FIG. 1, directly at the output drive shaft 11 or at any other suitable point in the drive train between the hydraulic motor 4 and the drive shaft 11. If the sensor 19 is provided at the hydraulic motor shaft 9, then in the electronic control unit 5 the speed of rotation of the hydraulic motor shaft 9 needs merely to be converted to the speed of rotation of the drive shaft 11 through the transmission ratio of the transmission 10. There may serve as sensor 18 a generator—which is in any event normally present—coupled with the drive motor 1, whereby the frequency of the output voltage of the generator is proportional to the speed of rotation of the drive motor and thus can find employment as a measure of the speed of rotation of the drive motor.

Below, the functioning of the drive in accordance with the invention will be described.

In starting operation and in slow travel operation, the drive of the vehicle is effected in known manner via the hydrostatic transmission 2, the hydraulic motor shaft 9, the transmission 10 and the drive shaft 11. The speed of rotation of the drive motor 1 is continuously detected via the sensor 18 by the electronic control unit 5. Upon a predetermined speed of rotation of the drive motor 1 being exceeded, a change-over point is reached at which change-over from the drive via the hydrostatic transmission 2 to the drive via the direct through-drive shaft 16 is effected. Before the closing of the separating clutch 17 there is effected, however, in accordance with the invention, a synchronization of the drive motor side speed of rotation $n_1$ to the drive shaft side speed of rotation $n_2$ at the separating clutch 17. For this purpose, initially, power regulation of the drive—which may be present, but which is not shown in FIG. 1—is set out of operation. Then, by means of the sensors 18 and 19, the speeds of rotation of the direct through-drive shaft 16 and the output drive shaft 11 are detected and compared in the electronic control unit 5.

If the comparison indicates that the drive motor side speed of rotation $n_1$ at the separating clutch 17 is smaller than the drive shaft side speed of rotation $n_2$, the drive motor 1 is deliberately de-loaded by means of action on the hydrostatic transmission 2, in order to increase the drive motor side speed of rotation $n_1$. For this purpose, either the hydraulic motor 4 is swung out to a greater displacement volume or the hydraulic pump 3 is swung back to a lesser displacement volume. With this, the working pressure and/or the delivery volume in the high pressure line of the hydraulic circuit 5 falls. As a result of the de-loading of the drive motor 1 which occurs, the speed of rotation of the direct through-drive shaft 16, i.e. the drive motor side speed of rotation $n_1$ at the separating clutch 17, increases correspondingly. The drive motor side speed of rotation $n_1$ and the drive shaft side speed of rotation $n_2$ are continuously detected by the electronic control unit 5 by means of the sensors 18 and 19. When the speeds of rotation substantially coincide, the synchronization procedure is concluded and the separating clutch 17 can be closed by means of the actuating device 20. Before or during the closing of the separating clutch 17 at least the hydraulic pump 3, but preferably also the hydraulic motor 4, can be brought into a neutral disposition without displacement volume by means of the setting members 15 and 14, in order to switch off the hydrostatic transmission 2.

If, upon attainment of the change-over point the drive motor side speed of rotation $n_1$ at the separating clutch 17 is greater than the drive shaft side speed of rotation $n_2$, the drive motor 1 is correspondingly loaded via the hydrostatic transmission 2, in order to reduce the drive motor side speed of rotation $n_1$. Thereby, either the hydraulic motor 4 is swung back to a smaller displacement volume by means of the setting unit 14 or the hydraulic pump 3 is swung out to a larger displacement volume by means of the adjustment unit 15, whereby the pressure and/or the delivery volume in the high-pressure line of the hydraulic circuit 5 is corresponding increased. As a result of the increased loading of the drive motor 1 which occurs, the speed of rotation of thereof and thus also the drive motor side speed of rotation $n_1$ at the separating clutch 17 is reduced. When the drive motor side speed of rotation $n_1$ substantially coincides with the drive shaft side speed of rotation $n_2$, the synchronization procedure is concluded, in that the separating clutch 17 is closed by means of the actuating device 20. Before or at the same time, the hydraulic pump 3 and the hydraulic motor 4 can be swung into a neutral disposition without displacement volume, in order to switch off the hydraulic transmission 2.

The described measures for the loading and de-loading of the drive motor 1 at the hydraulic motor 4 and the hydraulic pump 3 can, of course, be effected at the same time, in order to attain a particularly rapidly effected synchronization. Thereby, as described above, the swinging of the hydraulic pump is in each case opposite to the swinging of the hydraulic motor 4.

By means of the synchronization in accordance with the invention, the change-over from a drive via the hydrostatic transmission 2 to a drive by means of the direct through-drive shaft 16 can be effected in a manner which is particularly free of jerking.

The invention is not limited to the above-described exemplary embodiment. Instead of an electromagnetic working of the electronic control unit 5 on the setting members 14 and 15 and the actuating device 20 it is e.g. possible to use hydraulic or pneumatic working. Further, there may be employed a hydraulic pump 3 or a hydraulic motor 4 having a fixed, not regulatable, displacement volume.

I claim:

1. A hydrostatic drive for the wheels of a vehicle having a drive motor (1), a hydrostatic transmission (2) having at least a hydraulic pump (3) and a hydraulic motor (4) arranged in a hydraulic circuit (5) and including an adjustment device (14) acting upon the displacement volume of the hydraulic motor (4) and an adjustment device (15) acting upon the displacement volume of the hydraulic pump (3), said hydraulic pump (3) being coupled to the drive motor (1) and the hydraulic motor (4) being coupled to an output drive shaft (11), a direct through-drive shaft (16) which directly connects the drive motor (1) to the output drive shaft (11) in a releasable manner via a separating clutch (17) having an actuating device (20), and an electronic control unit (5), a first electronic sensor (18) for detecting the rotational speed ($n_1$) of the drive motor side at the separating clutch (17) and a second electronic sensor (19) for detecting the rotational speed ($n_2$) of the drive shaft side at the separating clutch (17), said electronic control unit (5) being connected to each of the sensors (18, 19), the adjustment devices (14, 15) and the actuating device (20) by control signal lines, characterized in that the control unit (5) selectively swings out the hydraulic motor (4) further to a greater displacement volume and swings the hydraulic pump (3) back to a smaller displacement volume before each closure of the separating clutch (17) if the rotational speed ($n_1$) of the drive motor side is initially smaller than the rotational speed ($n_2$) of the drive shaft side, and swings the hydraulic motor (4) back to a smaller displacement volume and swings the hydraulic pump (3) out to a larger displacement volume if the rotational speed ($n_1$) of the drive motor side is initially greater than the rotational speed ($n_2$) of the drive shaft side to synchronize the rotational speed (n) of the drive motor side with the rotational speed (n) of the drive shaft side at the separating clutch (17).

2. A hydrostatic drive according to claim 1, wherein the first sensor (18) is arranged at a shaft (8) of the drive motor (1).

3. A hydrostatic drive according to claim 1, wherein the second sensor (19) is arranged at the output drive shaft (11).

4. A hydrostatic drive according to claim 1, wherein the first sensor (18) is formed by a generator coupled to the drive motor (1), wherein there is detected the frequency of the output voltage of the generator which is proportional to the rotational speed of the drive motor (1).

5. A hydrostatic drive according to claim 1, wherein the hydraulic motor (4) is connected to the output drive shaft (11) via a transmission (10).

6. A method for operating a hydrostatic drive for the wheels of a vehicle having a drive motor (1), a hydrostatic transmission (2) having at least a hydraulic pump (3) and a hydraulic motor (4) arranged in a hydraulic circuit (5a) and including an adjustment device (14) acting upon the displacement volume of the hydraulic motor (4) and an adjustment device (15) acting upon the displacement volume of the hydraulic pump (3), said the hydraulic pump (3) being coupled to the drive motor (1) and the hydraulic motor (4) being coupled to an output drive shaft (11), a direct throughdrive shaft (16) which directly connects the drive motor (1) to the output drive shaft (11) in a releasable manner via a separating clutch (17) having an actuating device (20), a first electronic sensor (18), a second electronic sensor (19) and an electronic control unit (5) being connected to each of the electronic sensors (18, 19), comprising the steps of: detecting the rotational speed ($n_1$) of the drive motor side with the first electronic sensor (18) and the rotational speed ($n_2$) of the drive shaft side at the separating clutch (17) with the second electronic sensor (19), comparing the detected rotational speeds ($n_1$, $n_2$) with the electronic control unit (5), selectively swinging out the hydraulic motor (4) to a greater displacement volume and swinging back the hydraulic pump (3) to a smaller displacement volume if the detected rotational speed ($n_1$) of the drive motor side is smaller than the detected rotational speed ($n_2$) of the drive shaft side, and swinging back the hydraulic motor (4) to a smaller displacement volume and swinging out the hydraulic pump (3) to a greater displacement volume if the detected rotational speed ($n_1$) of the drive motor side is greater than the detected rotational speed ($n_2$) of the drive shaft side at the separating clutch (17), to synchronize the rotational speed (n) of the drive motor side with the rotational speed (n) of the drive shaft side at the separating clutch (17), closing the separating clutch (17) when the rotational speed ($n_1$) of the drive motor substantially coincides with the rotational speed ($n_2$) of the drive shaft at the separating clutch (17).

7. A method according to claim 6, wherein after synchronization of the rotational speed ($n_1$) of the drive motor side with the rotational speed ($n_2$) of the drive shaft side at the separating clutch (17), the hydraulic motor (4) and/or the hydraulic pump (3) are swung back into a neutral position without displacement volume and remain in this neutral position for so long as the separating clutch is closed.

8. A method according to claim 6, wherein the synchronization of the rotational speed ($n_1$) of the drive motor with the rotational speed ($n_2$) of the drive shaft at the separating clutch (17) and the closing of the separating clutch occur at a first change-over point where the rotational speed of the drive motor exceeds a predetermined rotational speed of the drive motor (1).

9. A method according to claim 6, wherein the separating clutch (17) is opened at a second change-over point which corresponds to falling below of the predetermined rotational speed of the drive motor (1).

* * * * *